United States Patent Office 3,488,826
Patented Jan. 13, 1970

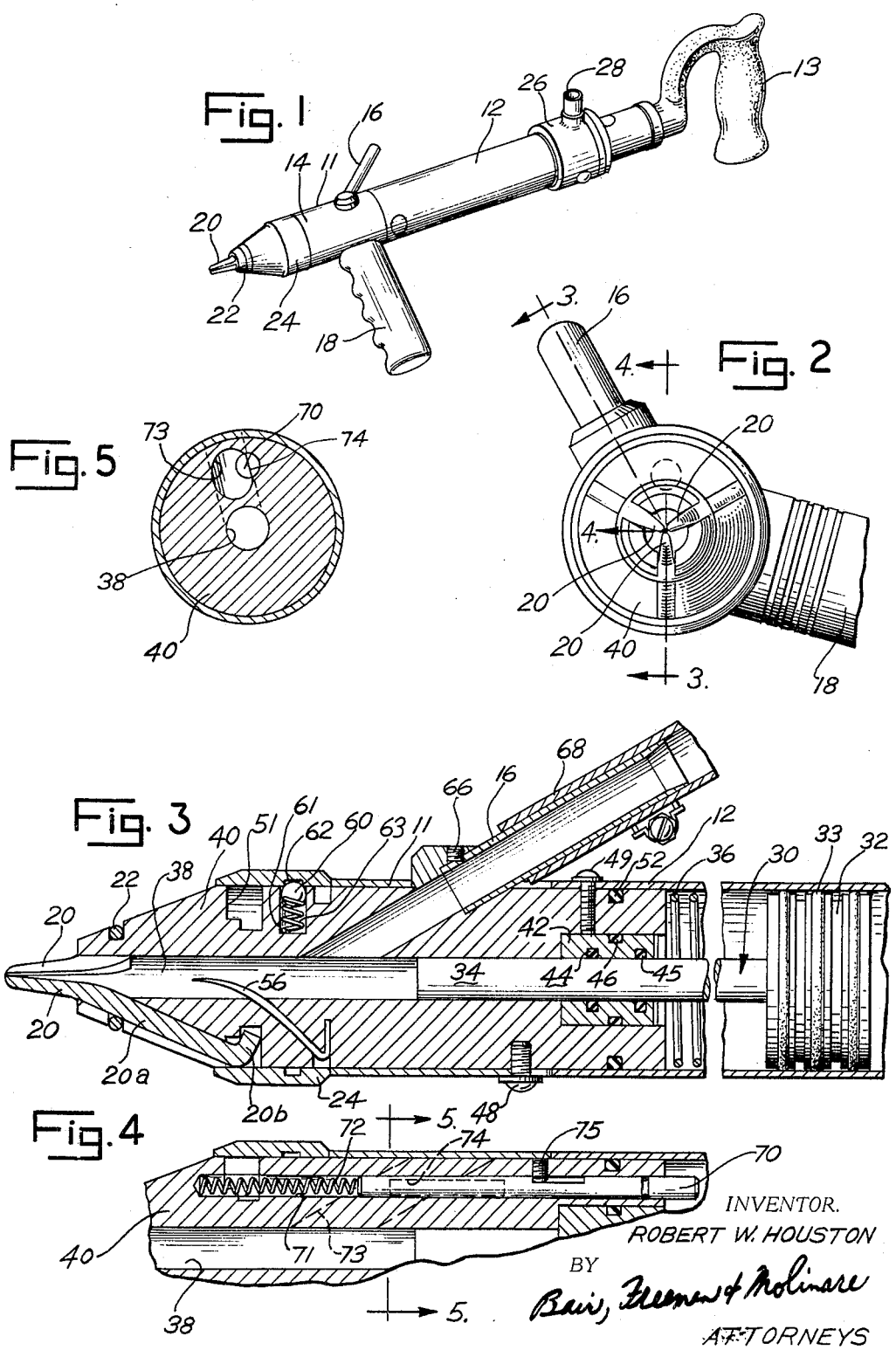

3,488,826
TIRE STUD GUN
Robert W. Houston, Cincinnati, Ohio, assignor, by mesne assignments, to Studebaker Corporation, a corporation of Delaware
Filed Aug. 23, 1967, Ser. No. 662,669
Int. Cl. B23q 7/00
U.S. Cl. 29—212                                    2 Claims

ABSTRACT OF THE DISCLOSURE

A tire stud gun mechanism for inserting tire studs head-first into an opening in a tire tread, such gun mechanism including a plurality of opening jaws each having an elongated arm adapted to extend into an opening in the tire tread for spreading same to facilitate entry of the stud into the opening and a relatively short arm for movably securing the jaw to the housing, and a collar detachably secured to the housing by ball detent means for removably securing the opening jaws to the housing so as to facilitate repair and/or replacement of the opening jaws.

BRIEF SUMMARY OF THE INVENTION

This invention relates to tire stud gun mechanism, and more particularly, to an improved tire stud gun mechanism having simplified readily removable means for retaining the jaw means and positioning springs and for permitting repair and replacement of the jaw means and positioning springs in such gun mechanism without affecting the remainder of the gun mechanism and without requiring special accessory tools to affect such repair or replacement.

The use of tire studs for aiding vehicle traction under adverse weather conditions, for example, ice and snow, has increased greatly in the past few years. Tire stud guns are now generally used for inserting tire studs into prepared openings in tire treads. Such openings or bores may be drilled into the tire tread of an existing tire or may be molded into the tire tread during manufacture of the tire. A form of tire stud gun to which the present application may be applied is shown in Boggild et al., Patent 3,-258,835. Such tire stud gun comprises essentially a cylindrical housing, a piston reciprocable in the housing, a base block at the back end of the housing, an actuator at the back end of the gun which is manually controlled to activate the piston, and a head assembly at the front end of the gun and through which a stud is delivered to the tire by each forward movement of the piston.

The head assembly comprises a head block having an axial piston rod receiving bore therein covered by an outer tubular member secured to the head block by a plurality of circumferentially spaced screws. A hand grip arrangement is secured to the head assembly tubular member for assisting the operator in handling the tire stud gun mechanism.

Within the head block are a plurality of longitudinal slots that parallel and intersect the axial bore and receive a plurality of jaws and positioning springs. The jaws and spring are subject to wear in use and must be periodically inspected for maintenance purposes and/or repair and replacement. In order to effect repair or replacement of the jaw means, it is necessary to remove the plurality of screws securing the tubular member to the headblock, then remove the tubular member from the headblock together with the hand grip. A screw driver or the like tool is necessary to remove the screws from the tire stud gun. The removal of the housing together with the hand grip to permit inspection of the opening jaws and positioning springs is relatively cumbersome.

An object of the present invention is to provide an improved tire stud gun mechanism having a collar detachably secured to the housing by ball detent means for removably securing the opening jaws and the positioning springs in the housing so as to facilitate repair and/or replacement of the jaws and positioning springs. Other objects and advantages of the present invention will become more apparent hereinafter.

BRIEF DESCRIPTION OF THE DRAWING

The attached drawing illustrates a preferred embodiment of the invention in which:

FIG. 1 is a perspective view of a tire stud gun mechanism embodying the present invention;

FIG. 2 is a front view of the tire stud gun mechanism of FIG. 1, with a portion of the hand grip being broken away;

FIG. 3 is a longitudinal cross-sectional view of the tire stud mechanism gun taken generally along line 3—3 of FIG. 2, with part of the cylindrical housing being broken away;

FIG. 4 is a detail sectional view taken generally along line 4—4 of FIG. 2 illustrating the stop rod mechanism for controlling the feed of studs one at a time into the central axis bore in the tire stud gun mechanism; and FIG. 5 is a transverse cross-sectional view taken generally along the line 5—5 of FIG. 4.

DESCRIPTION OF THE PREFERRED EMBODIMENT

Referring now to FIG. 1, there is illustrated a tire stud gun mechanism 10 embodying the present invention. The tire stud gun 10 comprises a cylindrical housing 12 having a handle means 13 secured to the rear thereof and having a head assembly mechanism 14 secured to the front thereof. A conduit fitting or inlet fitting 16 is secured to the head assembly 14 for feeding tire studs head first into an opening or bore extending axially of the head assembly. The fitting 16 is adapted to be connected to a suitable source of tire studs, for example, a prepackaged unit wherein studs are retained in predetermined end-to-end relationship or a feeder mechanism for feeding studs from a hopper into a conduit in end-to-end head first order. Secured to the head assembly is a hand grip 18 for facilitating holding of the tire stud gun mechanism 10.

Extending from the front end of the head assembly are a plurality of opening jaw means 20 adapted to be inserted into an opening in a tire tread for spreading the resilient wall defining the opening so as to permit insertion of a tire stud head first into such opening in the tire tread.

An annular resilient closing ring or O-ring 22 is adapted to be disposed about the plurality of jaw means for biasing the jaw means toward one another. The O-ring 22 is adapted to be retained in an exterior peripheral recess in the head assembly. The jaw means 20 are retained on the head assembly by means including a collar 24 that is removably and detachably secured to the head assembly in a novel manner as will be more fully explained hereinafter.

The cylindrical housing 12 includes an annular member 26 at the rear end thereof adapted to receive a fitting 28 which is in turn connected to a source of air under pressure.

With reference now to FIGS. 2 and 3, the construction and operation of the tire stud gun mechanism will be made more clear.

Disposed within the cylindrical housing 12 and reciprocable therein is a piston means 30 which includes a piston head 32 and a piston rod 34. Piston rings 33 may be provided on the piston head 32. Air introduced through the fitting 28 will apply pressure at the rear of the piston 32 for urging the piston means to the left as viewed in FIG. 3. The spring mechanism 36 retained in housing 12 about the piston rod 34 will urge the piston 32 to return to its starting position at the right as viewed in FIG. 3. The spring acts in opposition to air pressure introduced into the air chamber at the rear end of the cylindrical housing 12.

The piston rod or stem 34 is slidable within an axial bore 38 in the block member 40 which is retained within the cylindrical housing 12. The stem or rod 34 reciprocates within a bearing and seal arrangement 42 which includes a plurality of O-rings 44 and 45 sealing between the bearing block member 43 and the rod 34 and a single O-ring 46 which seals between the block 40 and the bearing block member 43. Suitable retaining means, as for example screw means 48, is provided for securing the annular sleeve portion 11 of the cylindrical housing 12 to the block member 40. Screw means 49 are provided to retain the annular sleeve or housing 12 in engagement with the block 40 and to secure block member 42 in place in block 40. The resilient ring 52 seals between the block 40 and cylindrical housing or sleeve 12.

Provided within the block 40 are a plurality of jaw means 20. The jaw means 20 comprise elongated generally L-shaped arm having a relatively long arm portion 20a and a relatively short angle portion 20b. The angle poriton 20b is adapted to engage within a recessed area indicated generally the numeral 51 within the block 40. In the embodiment shown, there are three jaws provided. The jaws 20 are biased into engagement with one another by an annular resilient ring 22 disposed and retained in a circumferential recess 52 in block 40.

Also provided within the block 40 are a plurality of positioning springs 56 for suitably positioning and orienting a stud within the bore 38.

A feature of the present invention is the means for detachably and removably securing the jaws 20 and springs 56 within the block 40 so as to facilitate repair and/or replacement of the jaws and springs. As best shown in FIG. 3, such means comprise a ball and detent arrangement including a spring biased ball 60 supported within a radially disposed opening 61 in the block 40. The ball 60 is engaged within an annular recess 62 in the inside wall of the collar 24. It will be observed that upon axial movement of the collar 24 with respect to the block 40, the ball 60 will be moved inwardly against the bias of the spring 63 so as to permit release of the collar 24 from the block 40. Upon removal of the collar 24 from the block 40, the three jaws 20 may be easily removed from the block 40 upon removal of the O-ring 22. Furthermore, romoval of the callar 24 will permit ready removal of positioning springs 26 from the block 40. It will be observed that the elements 20 and 56 may be removed after removal of collar 24 without in any way affecting any other components of the tire stud gun mechanism 10.

Referring again to FIG. 3, it is seen that the inlet fitting 16 for the tire studs is secured to the block 40 by suitable means, for example, a set screw 66. At the other end, the inlet fitting 16 is adapted to be connected to a conduit 68 which in turn is connected to a suitable source of tire studs.

In FIGS. 4 and 5, there is best seen the stop rod mechanism for controlling the feed of studs one at a time from the inlet fitting 16 into the bore 38 in response to actuation by the piston rod 34. The stop rod 70 is reciprocally slidable in a bore 71 within the block 40. At its forward end, the rod 70 abuts a spring 72 which biases the stop rod 70 rearwardly or to the right as viewed in FIG. 4. The stop rod 70 is adapted to be engaged by the front face of the piston head 32 during movement of the piston means 30 to the left as viewed in FIG. 4. The forward portion of the stop rod 70 is provided with a recess or cut out portion indicated at 74. In the position shown in FIG. 5, there is interference between the forward end of the rod 70 and the bore 73 in the block 40 which communicates the inlet fitting 16 to the bore 38. In this position, it is not possible for a tire stud to be fed from the inlet fitting into the bore 38. Upon movement of the stop rod 70 to the left when the piston means 30 moves to its full stroke position, interference is removed from passage 73 and a stud may then drop into bore 38. Undesired rotation of rod 70 is prevented by set screw 75 which engages in a longitudinal recess in the exterior of the rod 70.

In operation, when air pressure is applied to the rear end of piston head 32, the piston means 30 is moved to the left or forwardly as viewed in FIGS. 3 and 4, and the piston rod 34 moves within the bore 38 to push a tire stud head first through the end of the block 40 and through opening jaws 20 into an opening in a tire tread. At the end of the forward strokes of the piston, the forward side or front face of the piston head 32 engages with the rear end of the stop rod 70 to move the stop rod to the left as viewed in FIGS. 3 and 4. Upon movement of the stop rod to the left, the recessed area 74 in the rod 70 will move into alignment with the bore 73, thus clearing the bore so as to permit a single tire stud to pass from the conduit 68 and inlet fitting 16 into the bore 73. Upon return of the piston 32 and the piston rod 34 to the right under the bias of spring 36, the tire stud will be positioned in the bore 38. The rod 70 will be moved to the right by the spring 72, thus preventing a second tire stud from falling into the bore 38 through the bore 73. Upon application of air to the rear of piston, the operation will be repeated. The positioning springs 56 function to properly orient each tire stud as it passes through the bore 38 prior to entry into the jaws 20.

By the present invention, there has been provided a tire stud gun mechanism incorporating a relatively simple mechanism for removably and detachably securing the jaws and positioning springs within the housing of such mechanism. Preferably, the retaining means comprises an annular collar affixed to the housing means of the tire stud gun mechanism by a ball and detent arrangement, whereby upon axial movement of the collar with respect to the housing means, the collar may be detachably removed from the housing means so as to permit ready removal and replacement of the opening jaws and/or positioning springs of the tire stud gun mechanism without the need for any ancillary tools.

While I have described a preferred embodiment of my invention, it will be understood that my invention is not limited thereto, since it may be otherwise embodied within the scope of the following claims.

What is claimed is:

1. In a tire stud gun mechanism for inserting studs head-first into openings in a tire tread, said mechanism including housing means having a bore therein for receiving studs from a supply source, hand grip means on said housing means, positioning springs extending into said bore for properly orienting and positioning a selected stud in said bore, jaw means on said housing means for widening an opening in a tire tread into which the selected stud is to be inserted head-first, resilient ring means for retaining the jaw means and biasing them toward one another, and piston means for forcing said selected stud from the bore into the opening in the tire tread, the improvement comprising said jaw means comprising angle members having an elongated arm and a short arm, the short arm engaging in a recessed area in the housing means, removable collar means cooperating with the short arms of the jaw means for retaining the jaw means in the recessed areas in the housing means, and ball and detent mechanism operative between the collar means and the housing means for removably and detachably securing the collar means to the housing means, whereby, by movement of the collar means with respect to said housing means, the collar means can be removed from the housing means and the resilient ring means may be released to permit removal of the jaw means from the housing means for repair or replacement without further dis-assembly of the tire stud gun mechanism.

2. A tire stud gun mechanism as in claim 1, wherein the ball detent mechanism includes an annular recess provided in the interior of the collar means and a spring-loaded ball in the housing means cooperating with said recess, whereby axial movement of the collar will affect engagement and disengagement of the ball within the recess to permit retention and release respectively, of the collar means from the housing means.

References Cited

UNITED STATES PATENTS 3,258,835 7/1966 Boggild et al.
3,348,291 10/1967 Niedzwiecki.

THOMAS H. EAGER, Primary Examiner

U.S. Cl. X.R.

227—130